Feb. 11, 1936.   J. E. SIMONS   2,030,329
APPARATUS FOR COMPARING COLORS
Filed Sept. 22, 1934   2 Sheets-Sheet 1
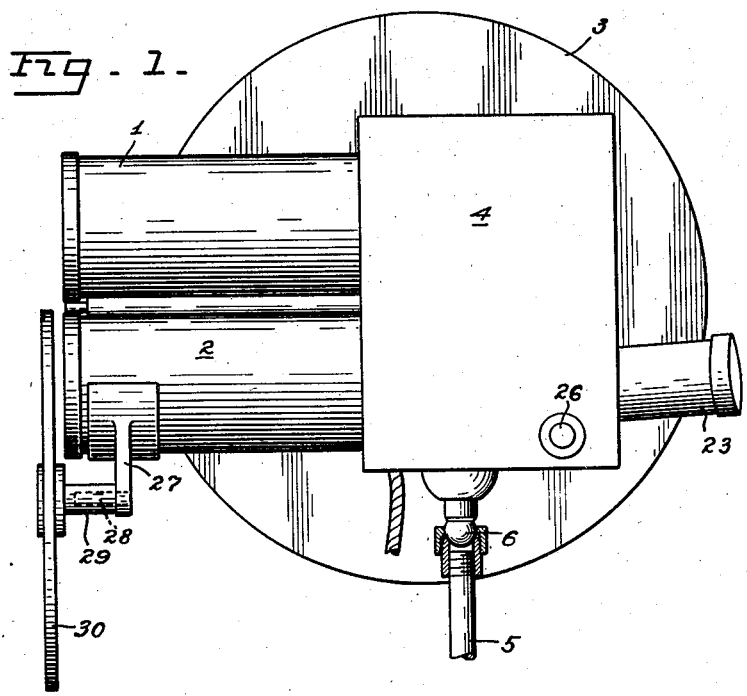
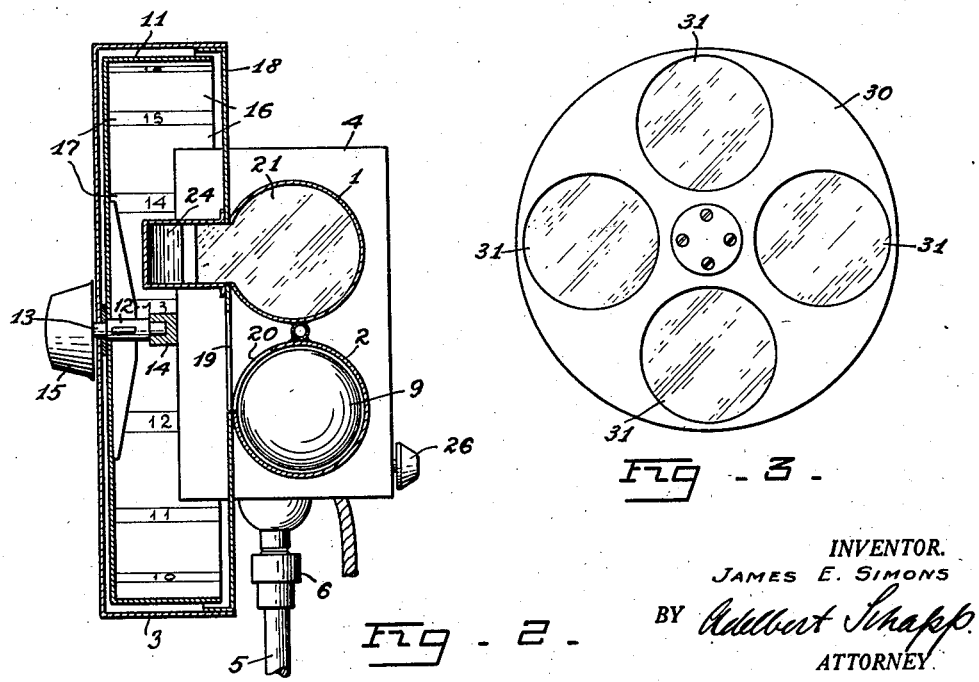
INVENTOR.
JAMES E. SIMONS
BY Adelbert Schapp
ATTORNEY Feb. 11, 1936.   J. E. SIMONS   2,030,329
APPARATUS FOR COMPARING COLORS
Filed Sept. 22, 1934   2 Sheets-Sheet 2

INVENTOR.
JAMES E. SIMONS
BY Adelbert Schapp
ATTORNEY

Patented Feb. 11, 1936

2,030,329

UNITED STATES PATENT OFFICE 2,030,329

APPARATUS FOR COMPARING COLORS

James E. Simons, San Francisco, Calif.

Application September 22, 1934, Serial No. 745,074

14 Claims. (Cl. 35—59)

The present invention relates to improvements in an apparatus for comparing colors and its principal object is to provide a convenient and accurate means for comparing different colors with the color of the human skin to allow the face powder best suited to the skin of an individual person to be determined.

A further object of the invention is to combine with the apparatus a means for determining the shade of rouge best adapted for harmonizing with the color of the eyes and hair and general complexion of an individual to produce a desired artistic and harmonious effect.

A further object of the invention is to provide means in combination with such apparatus for examining the texture and general condition of the skin under a magnifying glass so as to give an artist an opportunity to take these features into consideration in giving advice on proper treatment of the skin for producing the best artistic effect.

Further objects and advantages of my invention will appear as the specification proceeds.

In carrying out these objects it is particularly proposed to provide an apparatus in which a series of sample colors corresponding to different face powders may be brought successively into juxtaposition to the human face for determining the particular color harmonizing with the face.

It is further proposed to provide uniform illumination of the skin under observation and the color under comparison so that errors due to varying light effects may be eliminated.

It is further proposed to provide a reflecting system whereby images of the section of the skin and the color under observation may be brought into close proximity and into the same plane for further facilitating accurate observation.

It is further proposed to provide means for allowing the face under observation to be viewed through different shades of colored windows whereby the best shades of rouge for the particular face may be determined.

It is further proposed to provide magnifying means in the apparatus that may be used optionally for examining the condition of the skin under observation.

Figure 4:
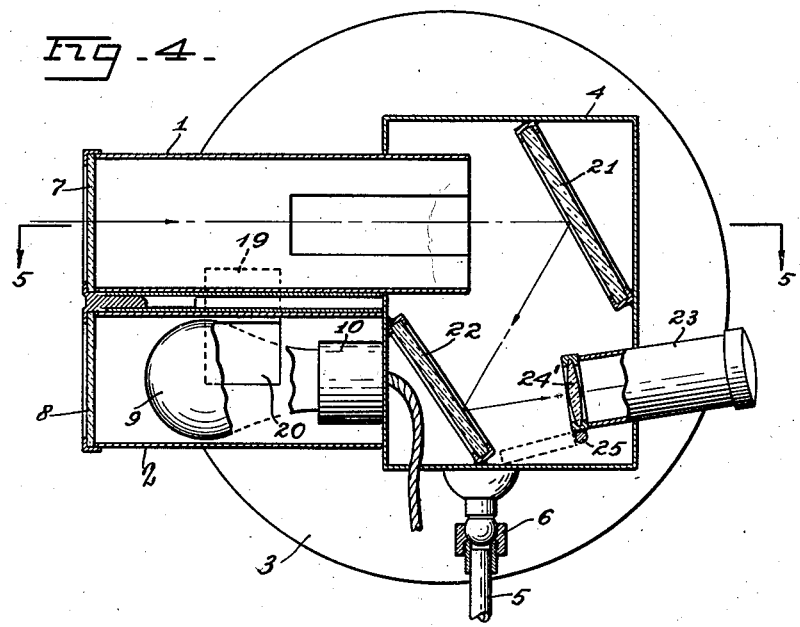
Figure 5:
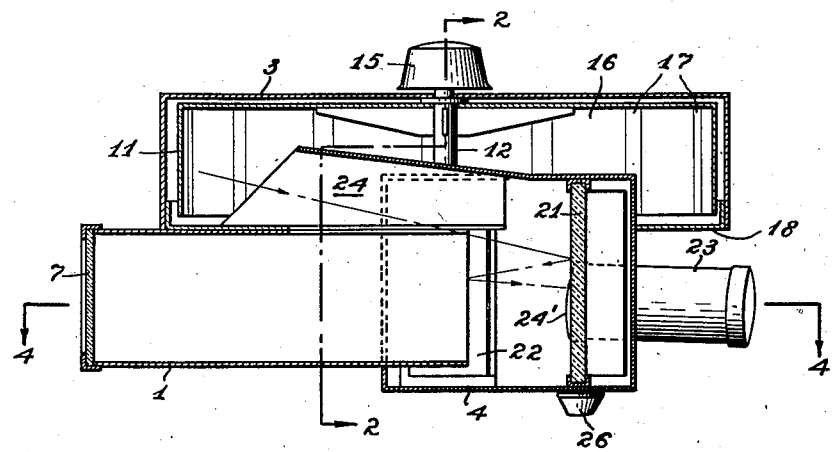

The preferred form of my apparatus is illustrated in the accompanying drawings in which, Figure 1 shows a side elevation of my apparatus, Figure 2 a transverse vertical section through the appartaus taken along line 2—2 of Figure 5, Figure 3 is a front view of an attachment adapted for determining the color of rouge best adapted for an individual face, Figure 4 a longitudinal vertical section through the apparatus, and Figure 5 a horizontal section through the device taken along line 5—5 of Figure 4.

While I have shown only the preferred form of my invention I wish to have it understood that various changes or modifications may be made within the scope of the claims hereto attached without departing from the spirit of the invention.

In its preferred form my apparatus comprises a conduit or tube 1 adapted to be directed at the face under observation, a light chamber 2, a drum housing 3 and a reflector housing 4, these parts being fixed relative to one another so that the light housing 2 is positioned under the conduit 1 and parallel thereto, while the drum housing lies in adjacent relation to the conduit and light housing and the reflector is arranged transversely behind the conduit and the light housing and extends partly into the drum housing. The entire device is preferably supported by means of standard 5 through a universal joint 6 which connects with the bottom of the reflector housing.

The conduit 1 is in the nature of a cylindrical tube and is provided with a transparent window 7 at the front end thereof. Its rear end extends into the reflector housing 4 and is supported thereby. The light housing 2 is also preferably of cylindrical form of substantially the same diameter as the conduit 1 and is provided with a front window 8 lying in the vertical plane of the window 7 while its rear end abuts against the reflector housing 4. A light 9 is supported in this housing in a socket 10.

The drum housing 3 is cylindrical in form and is secured to the reflector housing which projects into the drum housing in such a manner that the drum lies adjacent the conduit 1 and the light housing 2 with its axis transversely to the axes of the latter and on a plane midway between the conduit and the light housing. The drum housing is comparatively flat and of sufficient diameter to extend substantially from the front end of the conduit to a point behind the reflector housing.

A drum 11, slightly smaller in diameter than the drum housing is revolvably supported therein on a shaft 12 which takes bearing in the drum housing as at 13 and in a block 14 projecting from the reflector housing. The drum is open toward the reflector housing so that the latter which extends into the drum does not interfere with the rotation thereof. It may be operated by means of the knob 15 projecting outside of the drum housing.

The inner peripheral face of the drum is divided into a plurality of sections or fields 16 which are colored to correspond to or harmonize with the various shades of a plurality of face powders and the sections are numbered to correspond to the same numbers on the face powders by means of which the latter are identified. Intervening between the different sections thus colored there are smaller sections or strips 17 tinted to represent different shades of rouge harmonizing with adjacent sections of face powder colors.

The wall 18 of the drum housing adjacent the light housing has an opening 19 and the wall of the light housing has a corresponding opening 20 so that light rays from the lamp 9 may enter the drum housing and illuminate the interior of the drum, particularly the front portion thereof.

The reflector housing 4 has a reflector 21 mounted diagonally across the upper rear corner thereof and behind the conduit 1 so that light rays coming from the face of a person disposed in front of the conduit are reflected into a second reflector 22 mounted in opposite relation to the first reflector across the lower front corner of the reflector housing from where they are again reflected into a sight tube 23 supported in the rear wall of the reflector housing.

The latter housing has a light passage 24 (see Fig. 5) leading slantingly into the drum housing, the light passage being shaped so as to allow light rays emanating from any of the sections 16 and an adjacent strip 17 of the drum brought into the plane of the conduit 1 to pass to the reflector 21 so as to be reflected on the reflector 22 for observation through the sight tube 23. When looking through the sight tube, the images of the object and of the section 16 appear in adjacent relation, separated by the image of the intervening wall structure of the drum and the conduit. The latter has a magnifying glass 24' hinged thereto as at 25 and the glass may be moved between active and inactive positions by means of a knob 26 projecting from the reflector housing.

The front end of the light housing has a bracket 27 secured thereto and a pin 28 projects forwardly from the bracket to revolvably and removably receive a sleeve 29 carrying a disc 30 which has a plurality of windows 31 colored in different shades of red, the windows being disposed so that they may be brought into registry with the front end of the light housing 2. This attachment may be used for illuminating the face under observation in different shades of red to determine which shade best suits the color of the eyes, the hair and the general complexion of the face.

The method of using my invention is as follows: The operator or manufacturer first makes up a number of face powders of different shades and definitely identifies the same by giving each a number. He then applies sample colors corresponding to or harmonizing with the face powders to the different sections of the drum and identifies them by the same numbers. He next applies different shades of red to the intervening strips 17, each shade of red harmonizing with an adjacent section of face powder color. These steps, of course, may be changed in order or reversed.

Now the face of the customer is brought opposite the conduit 1, preferably about 12 inches distant, in a room of neutral light effect. The light in the light chamber then illuminates, through the window 8, the face of the customer and at the same time, through the openings 19 and 20, the inside of the drum. Light rays from the face pass through the conduit 1 to the reflector 21, thence to the reflector 22 and form an image that may be observed through the sight tube 23. At the same time light rays pass from that one of the colored sections 16 brought opposite the conduit 1 through the light passage 24 to the reflector 21 and from there to the reflector 22 to form an image that may be observed through the same sight tube 23 alongside the image of the customer's face. An adjacent red strip will show up at the same time. Now the operator observing the two images may manipulate the drum for bringing different sections of the same into juxtaposition to the conduit 1 until he finds two images on the reflector that perfectly harmonize. He notes the number identifying the color section harmonizing with the face and by the number he identifies the corresponding face powder. The corresponding rouge may be similarly identified.

It will be noted that by following this method and using the apparatus perfect results may be obtained. The illumination is the same for the face and for the colored sections of the drum, the reflecting system brings the two images into the same plane and into closer proximity and the entire apparatus saves the customer the embarassment of a close scrutiny such as would be caused by the operator placing different samples against the face for the purpose of comparison.

For studying the skin texture and the condition of the skin the magnifying glass 24' may be applied at the option of the operator.

For finding the rouge harmonizing with the general features of the face, the color of the eyes, the hair and the general complexion the disc 30 may be applied and the different windows positioned before the light housing until the proper shade has been found.

I claim:

1. A color comparing apparatus comprising a sight tube adapted to be directed at an object, a rotary drum mounted alongside of the tube and having a series of colors arranged on the inner periphery thereof and adapted to bring any one of the colors in side by side relation to the tube, an enclosure for the drum secured to the tube, a light chamber adjacent the drum enclosure and adjacent the tube and having means for illuminating the object and the color thus positioned, and a light passage leading from said color to the rear of the tube.

2. A color comparing apparatus comprising a sight tube adapted to be directed at an object, a rotary drum mounted alongside of the tube and having a series of colors arranged on the inner periphery thereof and adapted to bring any one of the colors in side by side relation to the tube, an enclosure for the drum secured to the tube, a light chamber adjacent the drum enclosure and adjacent the tube and having means for illuminating the object and the color thus positioned, a reflector behind the tube so as to receive an image of the object and a light passage leading from the color to the reflector for producing a color image on the latter in adjacent relation to the first image.

3. In a color comparing apparatus, a tube adapted to be directed at an object, a rotary drum mounted alongside the tube and having a series of colors arranged on the inner periphery thereof and adapted to bring any one of the colors in side by side relation to the tube and a light chamber fixed relative to the tube and having windows for illuminating both the object and the color thus positioned.

4. In a color comparing apparatus, a tube adapted to be directed at an object, a rotary drum mounted alongside the tube and having a series of colors arranged on the inner periphery thereof and adapted to bring any one of the colors in juxtaposition to the tube and a light passage leading diagonally from the said color to the rear of the tube.

5. In a color comparing apparatus, a sight tube adapted to be directed at an object, a rotary drum mounted alongside of the tube and having a series of colors arranged on the inner periphery thereof and adapted to bring any one of the colors in juxtaposition to the tube, a light chamber having windows for illuminating both the object and the color thus positioned and a light passage leading diagonally from the said color to the rear of the tube.

6. In a color comparing apparatus, a sight tube adapted to be directed at an object, a rotary drum mounted alongside the tube and having a series of colors arranged on the inner periphery thereof and adapted to bring any one of the colors in juxta-position to the tube, a light chamber having windows for illuminating both the object and the color thus positioned and an enclosure having a sight through which the object and the color may be observed under exclusion of external light.

7. In a color comparing apparatus, a sight tube adapted to be directed at an object and a rotary drum mounted alongside the tube and having a series of colors arranged on the inner periphery thereof and adapted to bring any one of the colors in juxta-position to the tube, the drum being open so as to allow the positioned color to be observed by a person looking through the tube at the object.

8. In a color comparing apparatus, a sight tube, having a window in front, adapted to be directed at an object, a reflector housing enclosing the back thereof, a drum housing mounted alongside the tube and enclosing part of the reflector housing, a drum revolvable in the drum housing and having a series of colors arranged on the inner periphery thereof and adapted to bring any of the colors in approximate juxta-position to the window, a light housing arranged adjacent the tube and the drum housing, a window allowing light to pass from the light housing to the positioned color, a second sight tube in the rear wall of the reflector housing and reflectors in the latter housing allowing the object and the positioned color to be observed through the second sight tube.

9. In a color comparing apparatus, a sight tube adapted to be directed at an object and a carrier mounted alongside the tube and having a series of colors arranged thereon and adapted to bring any one of the colors in juxtaposition to the tube, the tube having an opening in the sidewall thereof so as to allow the positioned color to be observed by a person looking through the tube at the object.

10. In a color comparing apparatus, a sight tube adapted to be directed at an object, a carrier mounted alongside the tube and having a series of colors arranged thereon and adapted to bring any one of the colors in juxtaposition to the tube, a source of light, and means for simultaneously illuminating both the object and the positioned color from the source of light.

11. In a color comparing apparatus, a sight tube adapted to be directed at an object, a carrier mounted alongside the tube and having a series of colors arranged thereon and adapted to bring any one of the colors in juxtaposition to the tube and reflecting means for bringing images of the object and the positioned color into the same plane.

12. In a color comparing apparatus, a sight tube adapted to be directed at an object, a carrier mounted alongside the tube and having a series of colors arranged thereon and adapted to bring any one of the colors in juxtaposition to the tube and reflecting means for bringing images of the object and the positioned color into the same plane, the reflecting means being arranged relative to the tube and the carrier so as to bring the images into closer than the original proximity for comparative observation.

13. In a color comparing apparatus, a sight tube adapted to be directed at an object, a carrier mounted alongside the tube and having a series of colors arranged thereon and adapted to bring any one of the colors in juxtaposition to the tube, a source of light, reflecting means for bringing images of the object and the said color into the same plane, a second sight tube arranged for observation of the images therethrough and means for excluding external light from the reflecting means.

14. In a color comparing apparatus, a sight tube adapted to be directed at an object, a carrier mounted alongside the tube and having a series of colors arranged thereon and adapted to bring any one of the colors in juxtaposition to the tube, a source of light, reflecting means for bringing images of the object and the said color into the same plane, a second sight tube arranged for observation of the images therethrough and means for excluding external light from the reflecting means, the second sight tube having a magnifying lens for magnifying the images.

JAMES E. SIMONS.